Sept. 30, 1947.  H. S. CAMPBELL  2,428,200
PITCH CONTROL FOR AIRCRAFT SUSTAINING ROTORS
Filed Aug. 7, 1942  2 Sheets-Sheet 1

INVENTOR
Harris S. Campbell
BY
ATTORNEYS

Sept. 30, 1947. H. S. CAMPBELL 2,428,200
PITCH CONTROL FOR AIRCRAFT SUSTAINING ROTORS
Filed Aug. 7, 1942 2 Sheets-Sheet 2
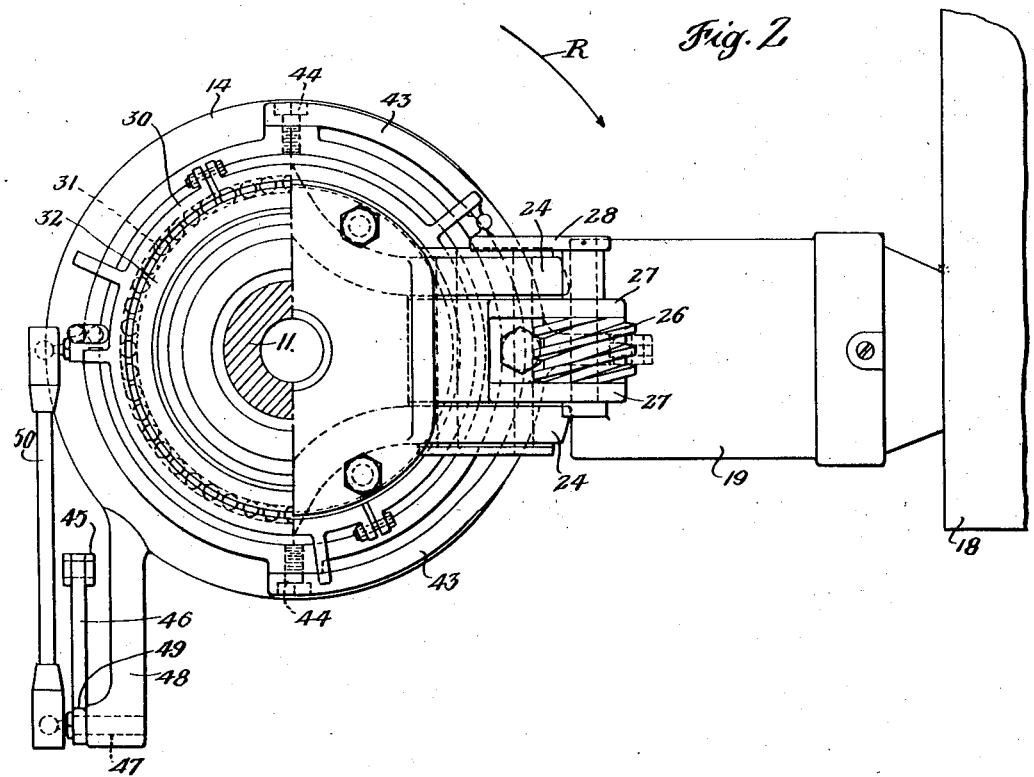
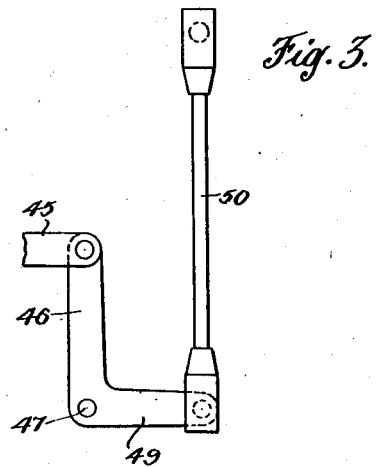
INVENTOR
Harris S. Campbell
BY
ATTORNEYS Patented Sept. 30, 1947

2,428,200

UNITED STATES PATENT OFFICE 2,428,200

PITCH CONTROL FOR AIRCRAFT SUSTAINING ROTORS

Harris S. Campbell, Bryn Athyn, Pa., assignor to Autogiro Company of America, Philadelphia, Pa., a corporation of Delaware Application August 7, 1942, Serial No. 453,932

5 Claims. (Cl. 170—160)

This invention relates to rotative winged aircraft, and especially to aircraft of this type in which the rotor blade or blades are mounted for pitch change movement.

Blade pitch change in sustaining rotors has been employed for control purposes, for example, in the manner described and claimed in copending application of Juan de la Cierva, Serial No. 698,372, filed November 16, 1933, and issued July 31, 1945, as Patent No. 2,380,582. When employing pitch change for control purposes, for instance for longitudinal and lateral attitude control, the pitch of each blade is caused to vary periodically with rotation of the rotor.

With various prior pitch control systems for the above purpose, aerodynamic and dynamic loads developed in the blades have been transmitted to the control system. For instance, during rotation of the rotor, especially when the control is adjusted appreciably from the neutral setting, inertia loads are set up as a result of the rapid periodic oscillations of the blades in the pitch change sense. Forces from this origin have heretofore been transmitted to the control system. Another source of undesired tendency to affect the control system is the rapid change which the blades experience in aerodynamic pitching moment during translational flight, even with the control system adjusted to the neutral position.

Loads from various origins such as the foregoing may cause deflections in the control linkage and even actual movement of the complete control system, with the result that undesired blade pitch changes occur. Under some forces and conditions, these undesired pitch change movements tend to build up resonantly, thereby becoming excessive, and causing objectionable vibrations even of the whole aircraft.

According to the present invention a pitch control system is provided, which system completely or at least partially restrains the blades as against undesired movements while at the same time permitting free operation of the control system by the pilot.

With the above in mind, the invention contemplates employment of a wholly or partially irreversible device in the control linkage, which device is located, preferably both functionally and structurally, close to the blade. In the preferred construction, the irreversible device comprises complementary worm and worm wheel elements, the latter of which is mounted directly on the blade, so that the undesired forces are arrested at their origin and prevented from entering the control system.

In considering another aspect of the invention it should be kept in mind that sustaining rotors ordinarily incorporate one or more pivots for the blades by means of which the blades are connected with the hub. Usually each rotor blade is connected with the hub at least by a "flapping" pivot and preferably also by a "drag" pivot, providing, respectively, for swinging movement of the blade in a direction generally transverse of the mean rotative path of travel and in a direction within the said path of travel.

In such a pivoted rotor, pitch control connections must necessarily accommodate the swinging movements of the blades and the means provided for such accommodation necessarily introduces additional links, joints, levers, or the like, in all of which additional opportunity is afforded for aerodynamic and dynamic loads to set up undesired vibrations and the like.

With the foregoing in mind, the invention further contemplates special arrangement of the irreversible pitch control device with relation to the blade pivots, and also special arrangement of the actuating connections, whereby not only to accommodate flapping or lag-lead movements of the blades but also to arrest undesired blade movements in the pitch change sense at a point in the control system beyond the mechanism for accommodating the swinging movements of the blades.

Still another factor which should be kept in mind is that swinging movements of the blades, especially in the flapping sense, should not extensively alter the blade pitch. However the invention contemplates that a minor change in blade pitch may desirably be brought about as a result of flapping movement.

The manner in which the foregoing objects and advantages are accomplished and also others which will occur to those skilled in the art will appear more fully from the following description, referring to the accompanying drawings.

In the drawings:

Figure 2 is a partial horizontal section and a partial plan of the arrangement shown in Figure 1, this view being taken as indicated by the line 2—2 on Figure 1; and Figure 3 is a fragmentary view of certain details of the control system of Figures 1 and 2.

Figure 1:
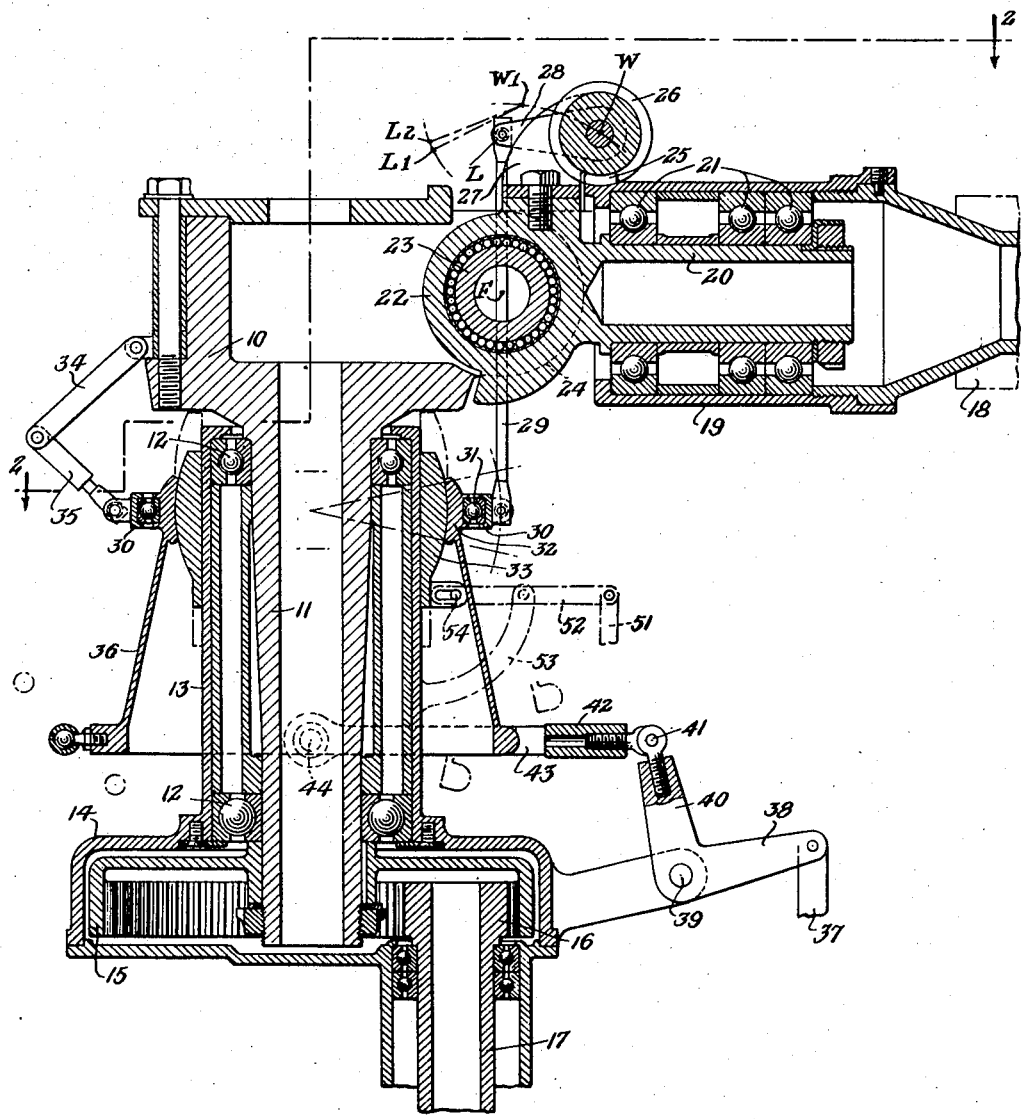
Figure 1 is a vertical sectional view through a rotor hub and root end mounting of a blade, the parts being arranged in accordance with the invention.

Reference is first made to the hub which is best illustrated in Figure 1. As there shown, the hub 10 is arranged toward the upper end of a rotative hub spindle 11 which is mounted in bearings 12—12 in the sleeve 13 constituting a part of a fixed rotor hub support 14. At its lower end the hub spindle 11 is provided with an internal ring gear 15 with which a pinion 16 is adapted to mesh, this pinion being driven by shaft 17. In the case of a helicopter, the rotor drive would be employed in normal operation.

In the case of an aircraft in which the rotor is normally adapted for autorotational actuation, the rotor drive may be employed for starting purposes on the ground prior to take-off. The shafting 17 for driving pinion 16 may be coupled with a power plant in the body of the aircraft, for instance in the case of an autorotative winged machine, the shafting 17 may be coupled with the engine employed to drive the usual propulsive airscrew. The rotor drive preferably incorporates a manually operable clutch and also a free wheeling clutch, neither of which are illustrated herein, since they form no part of the present invention per se.

Any suitable number of blades may be incorporated in the rotor. In the embodiment illustrated the rotor is three-bladed. Each blade (the root end of one such blade being indicated at 18) is provided with an external sleeve or bearing part 19 mounted on a spindle 20 by means of bearings 21—21, this mounting providing an axis for blade movement substantially coincident with the longitudinal axis of the blade and, therefore, constituting a pitch change mounting for the blade. Spindle 20 projects from a link part, the inner end of which is provided with an apertured eye 22 adapted to cooperate with a flapping pivot 23, the ends of which are received in pairs of lugs 24—24 which project from the hub 10. Pivot 23 thus provides freedom for swinging movement of the blade in a direction generally transverse the mean rotative path of travel, this swinging movement being desirable for the purpose of compensating for differential lift effects during translational flight as between the advancing and retreating sides of the rotor.

Adjacent its inner end the sleeve 19 of the pitch change mounting is provided with a worm wheel segment 25, with which the worm 26 is adapted to mesh. This worm is mounted by means of a pair of brackets 27—27 which project upwardly and then radially outwardly from the link comprising spindle 20 and eye 22. Rotation of worm 26, therefore, effects movement of sleeve 19 about the axis of spindle 20 and thereby changes the blade pitch.

The worm 26 is provided with an axis member, provided at one end with an actuating arm 28, this arm extending radially inwardly for cooperation with the upper end of vertical push-pull rod 29, the joint between the rod and arm 28 preferably being of the ball and socket or universal type to accommodate various of the control movements. The lower end of rod 29 is similarly universally connected with a rotative swash ring 30 mounted by means of a bearing 31 on a non-rotative swash member 32. Member 32 in turn has a spherical seat riding on the spherical part 33 surrounding the fixed hub supporting sleeve 13.

The rotative swash ring 30 is constrained to rotate with the rotor by means of one or more scissors linkages such as indicated at 34—35. Link 34 of this linkage is coupled with the hub and link 35 with ring 30, the two links being interconnected as clearly appears in Figure 1. The joints between the two links (34 and 35) and between link 34 and the hub are desirably simple pivot joints, whereby the rotative motion of the hub is utilized to ensure rotation of ring 30 therewith. The joint between link 35 and the ring 30 is desirably of the universal type whereby to accommodate various angular tilting movements of the ring.

For control purposes, the non-rotative swash member 32 is provided with a depending skirt 36, with which control linkages are connected, as follows:

A vertical push pull-rod 37 is coupled with one arm 38 of the bell crank pivoted at 39, the other arm 40 of this bell crank being connected as by a universal or ball joint 41 with the base part 42 of a yoke, the prongs 43—43 of which extend to embrace the lower edge of skirt 36. The ends of prongs 43 are pivotally coupled with the lower edge of the skirt as indicated at 44—44. Actuation of push-pull member 37, therefore, effects tilting movement of the skirt 36 and thus also of the swash member 32 and of the rotative swash ring 30, thereby effecting differential change of blade pitch, the push-pull rods 29 for the several blades being caused to move upwardly at one side of the rotor and downwardly at the opposite side.

Tilting movement of the swash members in a plane at right angles to the movement just described is effected by another linkage best illustrated in Figures 2 and 3. As there shown, a push-pull rod 45 is connected with one arm 46 of a bell crank which is pivoted at 47 to a fixed bracket 48 projecting from the non-rotative hub support 14. The other arm 49 of the bell crank is linked to the rotative swash ring 30 by a rod 50. The joints at both ends of rod 50 are desirably of the ball or universal type as clearly appears in both Figures 2 and 3. Actuation of push-pull member 45 thus effects swinging movement of the skirt 36 and of the swash members in a plane at right angles to the movement transmitted by push-pull member 37. The universal joint at 41 permits swinging movement of the yoke comprising parts 42 and 43—43, during actuation of the push-pull member 45. Similarly the universal joints at the ends of rod 50 accommodate the swinging movement of the swash members introduced by actuation of push-pull member 37.

The two control linkages described just above serve to tilt the swash member in two planes at right angles to each other, thereby serving to set up control moments in two different planes at right angles to each other. The sense in which these controls operate is brought out more fully hereinafter.

In addition to the periodic differential pitch variation made possible by the portions of the control system thus far described, provision is made for simultaneously increasing and decreasing the pitch of all blades in the same sense, pitch change of this type being useful for various purposes in the operation of rotative winged aircraft, whether of the type in which the rotor is normally power driven or of the type in which the rotor is normally autorotationally actuated and power driven only in preparation for take-off. In the latter case the simultaneous pitch control may be utilized for effecting direct or substantially vertical take-off by initially driving the rotor prior to leaving the ground to an R. P. M. appreciably higher than the normal autorotative R. P. M. During such overspeeding of the rotor the mean blade pitch is maintained at a low or substantially zero setting and the take-off is effected by disconnecting the rotor drive and increasing the blade pitch whereby to convert the excess kinetic energy into lift. Take-off of this type is more fully disclosed in copending application of Juan de la Cierva, Serial No. 738,349, filed August 3, 1934, and issued July 31, 1945, as Patent No. 2,380,583.

The simultaneous type of pitch change may also be utilized for other purposes, such for instance, as in a normally power driven rotor upon engine failure. In this event, the mean blade pitch may be reduced from the normal flight setting to an appropriate setting for autorotational actuation of the rotor, so that the machine may descend without power.

The mechanism provided herein for simultaneous pitch change may be employed for any of the above purposes and comprises a sliding mounting for the spherical part 33 on the sleeve 13. Vertical movement of spherical part 33 may be effected by a push-pull member 51 coupled with a lever 52 pivoted intermediate its ends on a bracket 53, the inner end of lever 52 being connected as at 54 with the spherical part 33. In Figure 1 these parts have been illustrated in dot and dash lines, for the reason that they would normally be offset from the plane of the drawing to a different position around the rotor hub, in order to clear other control parts, such as the linkage 37, 38, 40, 42, etc.

In analyzing the operation of the mechanism shown, it is first noted that the rotor here shown rotates in the direction indicated by the arrow R in Figure 2. It is further assumed that the front of the machine is toward the left in Figures 1 and 2. On this basis, downward movement of push-pull member 37 causes swinging movement of the skirt 36 to the right when viewed as in Figure 1 (i. e., toward the tail of the machine) and this in turn raises push-rod 29, thereby rotating worm 26 in the clockwise direction when viewed as in Figure 1. This movement acts to reduce the pitch of blade 18 as it passes over the tail of the machine. This same control movement results in a similar and equal increase of blade pitch as the blades pass at the front of the machine.

Since the control moment resulting from periodic differential pitch change manifests itself in a plane generally at right angles to the plane containing the points of maximum pitch increase and maximum pitch decrease, the pitch change described just above results in a lateral control moment, i. e., a shifting of the lift line of the rotor to the right of the center of gravity of the machine. In consequence, the machine banks downwardly at the left hand side.

Conversely, an upward movement of push-pull member 37 causes the machine to bank downwardly at the right hand side.

Similar control moments in the longitudinal plane may be effected by the push-pull member 45 which causes skirt 36 to tilt in a transverse plane, thereby effecting periodic differential pitch change in a sense such that the points of maximum and minimum pitch are reached when the blades pass the transverse axis of the machine. When the push-pull member 45 is moved to cause the point of maximum pitch increase to be reached when the blades pass the transverse axis of the machine on the advancing side of the rotor, the control moment causes the machine to nose upwardly. The converse again applies for nose-down moments.

As hereinbefore mentioned, various forces and vibrations originating in the blades have a tendency to deflect or move parts of the control system. Even if these forces are not of magnitude sufficient to actually cause the entire control system to move, they are objectionable in the control system since they tend to deflect linkages or the like and cause vibrations at points of lost motion. The control system of the present invention incorporates a partially or wholly irreversible device which is located at the blade itself and thus at the very origin of the forces which have heretofore introduced troublesome effects in the control system.

In the mechanism described, the irreversible device comprises the worm and worm wheel elements 26 and 25, the latter of which it will be noted is directly mounted on the blade itself, in view of which any forces tending to undesirably move the control system are immediately arrested before transmission to any of the control linkages. It is especially to be noted that the foregoing has been accomplished notwithstanding the fact that the blades are pivotally connected with the hub, as by means of flapping pivot 23. Moreover, in this form of construction the objects and advantages above discussed have been accomplished notwithstanding the location of the pitch change mounting outboard of the flapping pivot, this relationship being important for a number of reasons including the fact that pitch change movement of the blade does not alter the angularity of the flapping pivot axis.

It is to be understood that the worm device (or any functionally similar mechanism) may be either totally or only partially irreversible. For most purposes I prefer at least a high degree of or total irreversibility, although it is contemplated that in some instances it may be desirable to reduce the degree of irreversibility so as to permit the transmission of a fraction of the loads to the control system, thereby enabling the pilot to sense or "feel" the conditions under which the rotor is operating.

With respect to the mechanism described, it is further to be noted that notwithstanding the employment of flapping pivots, the control connections are such as to avoid extension blade pitch change as a result of flapping movement, although in the mechanism shown in the drawings, a minor degree of blade pitch change accompanies flapping movement of the blade.

Under some circumstances it is of advantage that some blade pitch change occur upon flapping movement. For instance, for certain purposes it is desirable that the blade pitch should be decreased slightly as the blade flaps upwardly. The control connections herein illustrated are arranged to accomplish this purpose. The manner in which this is effected will be clear from the following:

Referring to Figure 1, when the blade flaps upwardly about the flapping axis F, the center point of the worm 26, which has been indicated at W, moves to the point indicated at W—1. This represents a rather large upward flapping movement of the blade, but even this movement does not extensively alter the blade pitch. Note that point L would reach point L—1 when the upward flapping movement occurred if the arm 28 did not rotate about the worm axis W. With a given setting of the swash ring 30, the upward flapping movement just referred to would actually bring point L to point L—2, but since the arc between points L—1 and L—2 is very small, the degree of pitch change is likewise very small, even for a flapping movement of considerable magnitude.

In addition to the foregoing, since the point L—2 is higher than point L—1, the small degree of pitch change which does take place with flapping is in the pitch decreasing sense, i. e., pitch decrease with upward flapping movement and pitch increase with downward flapping movement.

The mechanism of the type just described is useful in instances where it is desired to utilize a small automatic pitch variation accompanying flapping.

I claim:

1. In an aircraft having a sustaining rotor incorporating a hub and a blade, the latter being connected with the hub by means of a flapping pivot, a pitch change mounting for the blade, and mechanism for controlling the blade pitch including cooperating worm and worm wheel elements, the latter of which is connected with the blade and moves therewith in the pitch change and flapping senses, the worm element being mounted to move with the blade in the flapping sense, and actuating means for the worm constructed and arranged to effect pitch change movement of the blade in predetermined relation and in response to flapping movement of the blade.

2. A construction in accordance with claim 1 in which the actuating means is arranged to provide for pitch decrease upon upward flapping movement of the blade, and vice versa.

3. A construction in accordance with claim 1 and further incorporating manually operable means for adjusting said actuating means.

4. A construction in accordance with claim 1 in which the actuating means is arranged to provide for pitch decrease upon upward flapping movement of the blade, and vice versa, the construction further incorporating manually operable means for adjusting said actuating means.

5. An aircraft supporting rotor having a hub member, a rotor blade, a flapping pivot attaching said blade to said hub member, a pitch pivot for said blade located outboard of said flapping pivot, means for controlling the pitch setting of said blade including a worm wheel attached to the blade and moveable with the blade upon pitch change and flapping, a worm member engaging said wheel and mounted on an axis approximately parallel to the flapping axis and swinging with the blade on said flapping axis, means for actuating said worm member including a pitch control member having movement in a vertical plane, said worm member and pitch control member being located at opposite sides of the flapping pivot, and a push rod interconnecting said members to rotate said worm member and lying approximately perpendicular to and approximately in the vertical plane of said flapping pivot.

HARRIS S. CAMPBELL.

REFERENCES CITED

The following references are of record in the file of this patent:

UNITED STATES PATENTS

| Number | Name | Date |
|---|---|---|
| 1,870,928 | Smith | Aug. 9, 1932 |
| 1,986,709 | Breguet et al. | Jan. 1, 1935 |
| 2,216,162 | Cierva | Oct. 1, 1940 |
| 2,256,635 | Young | Sept. 23, 1941 |
| 2,030,578 | Flettner | Feb. 11, 1936 |
| 2,162,794 | Von Asboth | June 20, 1939 |

FOREIGN PATENTS

| Number | Country | Date |
|---|---|---|
| 477,349 | Great Britain | Dec. 28, 1937 |